United States Patent [19]
Brown et al.

[11] 3,974,983
[45] Aug. 17, 1976

[54] TAPE FEED AND REWIND CARTRIDGE

[75] Inventors: Louis R. Brown, Livonia; Michael A. Saunders, Westland, both of Mich.

[73] Assignee: Burroughs Corporation, Detroit, Mich.

[22] Filed: June 9, 1975

[21] Appl. No.: 585,320

[52] U.S. Cl. ............................... 242/194; 242/197; 360/132
[51] Int. Cl.² ..................... G03B 1/04; G11B 15/32
[58] Field of Search ........................... 242/197–200, 242/194, 55, 19 A, 18 D; 352/72, 78 R; 360/93, 96, 132, 91, 92

[56] References Cited
UNITED STATES PATENTS

| | | | |
|---|---|---|---|
| 3,453,397 | 7/1969 | Miller et al. | 242/180 X |
| 3,612,539 | 10/1971 | Bragas | 360/95 X |
| 3,728,081 | 4/1973 | Bidanset | 360/95 X |
| 3,894,701 | 7/1975 | Moscaret et al. | 242/194 |
| 3,902,680 | 9/1975 | Neff | 242/198 |

*Primary Examiner*—Leonard D. Christian
*Attorney, Agent, or Firm*—Ronald L. Taylor; Edwin W. Uren; Kevin R. Peterson

[57] ABSTRACT

A tape handling cartridge is provided for receiving and transporting a double-ended coded tape containing stored machine-readable information past a tape reader forming part of a memory loader in a computer, an elongated section of the cartridge being insertable into the computer and into cooperable relationship with the reader and a power source associated therewith, drive means of the cartridge serving thereafter to feed the tape from a supply compartment of the cartridge into readable relationship with the reader and to rewind the tape on a take-up spool in the cartridge in helically coiled form suitable for subsequent re-entry and re-reading.

33 Claims, 9 Drawing Figures

TAPE FEED AND REWIND CARTRIDGE

BACKGROUND OF THE INVENTION

Prior art tape handling cartridges for inputting data into computer memories have provided for the storage of endless loop information-bearing tapes within separate cartridges with the mass of each tape helically coiled around stationary and angularly disposed segments formed in a bin section of its associated cartridge, and with an extended loop of the endless tape positioned in a transport guideway housed within an elongated section of the cartridge, such extended loop leading from a central core in the bin section to form the outermost coil of the tape mass helically coiled around the stationary bin section segments. Upon insertion of the elongated sections of such prior art cartridges into the console of a computer, geared sprockets carried by the cartridges are rendered responsive to a power source of the computer to advance the stored tapes along their transport guideways into readable relationship with a tape reader in the computer, the tapes during such advancement being withdrawn from the innermost coil of the tape masses within the bin sections and thereafter wound around the stationary segments to form the outermost coils of the tape masses. Prior art tape cartridges of the type described are generally provided with geared sprocket assemblies having drum portions that contain parallel and circumferentially disposed grooves for accommodating the sensing pins or interposers of mechanically actuated tape readers, passage of such pins through the codably configured apertures in the information-bearing tapes and into the circumferential grooves formed in the drum portions serving to actuate code bails of a decoding mechanism and to thereby generate multilevel electrical code signals that are utilizable by the memory loader of the computer. A prior art mechanically actuated tape reader is disclosed in U.S. Pat. No. 3,562,493 and an endless loop tape handling cartridge for use in association therewith is disclosed in U. S. Pat. No. 3,590,221, both of such patents having issued to Malkowski and assigned to the assignee of the present application.

Prior art tape handling cartridges of the type described supra have necessitated the employment of endless loop tapes, and the difficulty of changing such tapes within the cartridges to thereby make the required number and lengths of tapes available to a computer user have tended to limit and to restrict the utility of such cartridges in the inputting of data into computer memories. Furthermore, the employment of a plurality of such endless loop tape handling cartridges for storing the required number and lengths of tapes and for the selectable inputting of data stored within individual cartridges has proven to be economically impractical and unfeasible. In addition to the disadvantages of known tape handling cartridges that have obtained by reason of the limited utility of endless loop tapes, a further limitation to their utility arises by reason of their exclusive compatability with mechanically actuated memory loaders, which operate in the relatively slow inputting range of approximately 15 coded characters per second, such cartridges being ineffective for use in association with photo-electric memory loaders that are capable of inputting data at a speed of approximately 100 coded characters per second.

SUMMARY OF THE INVENTION

It is accordingly an object of the present invention to provide a tape feed and rewind cartridge that will accommodate double-ended information-bearing tapes of various lengths.

It is another object of the present invention to provide a tape feed and rewind cartridge wherein a double-ended tape of predetermined length may be conveniently inserted and readably processed, and wherein the tape once processed is rewound within the cartridge in re-usable form and in such condition as to be readily removable from the cartridge and returned to a suitable storage area.

It is a further object of the present invention to provide a tape feed and rewind cartridge that is utilizable for readably processing a plurality of double-ended tapes of various lengths and containing a wide variety of stored data, and that will rewind each tape following its readable processing preparatory to its removal from the cartridge and return to the storage area in an appropriately identified container.

It is still another object of the present invention to provide a tape handling cartridge that may be adapted for receiving in a supply compartment thereof an inexpensive storage container having a double-ended helically coiled information-bearing tape disposed therewithin, and that will with minimum human initiating assistance withdrawably feed the tape from the container past a tape reader into a take-up compartment where it is rewound in re-usable form for re-insertion into the storage container, the container being then removed from the supply compartment and returned to the storage area.

It is yet a further object of the present invention to provide a tape feed and rewind cartridge having optimum utility and flexibility, and that may be utilized in association with both mechanically actuated and photo-electric memory loaders contained within a computer.

An important aspect of the invention is the provision of a unitary tape feed and rewind cartridge comprised of a main body section that serves as a tape rewind compartment, a hinged lid section that serves as a tape supply compartment, an elongated section that extends from the main body section and that serves as a tape transport guideway leading indirectly from the supply compartment to the rewind compartment, and drive means effective for feedably advancing the tape from the supply compartment along the transport guideway and into a helically coiled configuration in the rewind compartment, the elongated section being designed for insertion into the console of a computer to engage the drive means thereof with a power source of the computer and to provide exposure of the transported tape at a predetermined read station along the transport guideway to a tape reader forming a part of a memory loader of the computer.

Other important characteristics of the present invention obtain from the structure of the hinged lid section of the cartridge, and from the provision of two separate read stations along the transport guideway in the elongated section, the hinged lid section being operably displaced at a predetermined angle from the main body section when the cartridge is in an operating mode, to thereby facilitate withdrawal of the tape from the supply compartment and feedable advancement thereof along the transport guideway, and the two separate read stations disposed along the transport guideway rendering the cartridge utilizable in association with the tape reader of either a mechanically actuated memory loader or a photo-electric memory loader.

Yet another important aspect of the invention is the particular structure and function of the rewind means disposed within the rewind compartment of the cartridge, such rewind means comprising a rotatably mounted flywheel that is continuously driven by the drive means of the cartridge when the cartridge is in an operating mode, a take-up spool mounted for independent rotation relative to the flywheel and having a concentric outer surface and a pair of eccentric inner surfaces disposed in coaxial and encompassing spaced apart relationship with the flywheel, a pair of oppositely disposed ingress channels formed in the take-up spool and connecting the outer and inner surfaces thereof, said channels cooperating alternately with a resilient guide member that communicates with the transport guideway, and coupling means associated with the flywheel and with the eccentric inner surfaces of the wake-up spool, said coupling means being responsive to the receipt of the leading end of a transported double-ended tape to impactably couple the take-up spool with the flywheel and to thereafter wind the double-ended tape around the concentric outer surface of the take-up spool for subsequent removal and return of the tape to its storage location.

BRIEF DESCRIPTION OF THE DRAWING

These and other objects, advantages and features of the invention will become more readily apparent from the following detailed description when read in conjunction with the accompanying drawing figures in which.

DESCRIPTION OF THE PREFERRED EMBODIMENT

Figure 1:
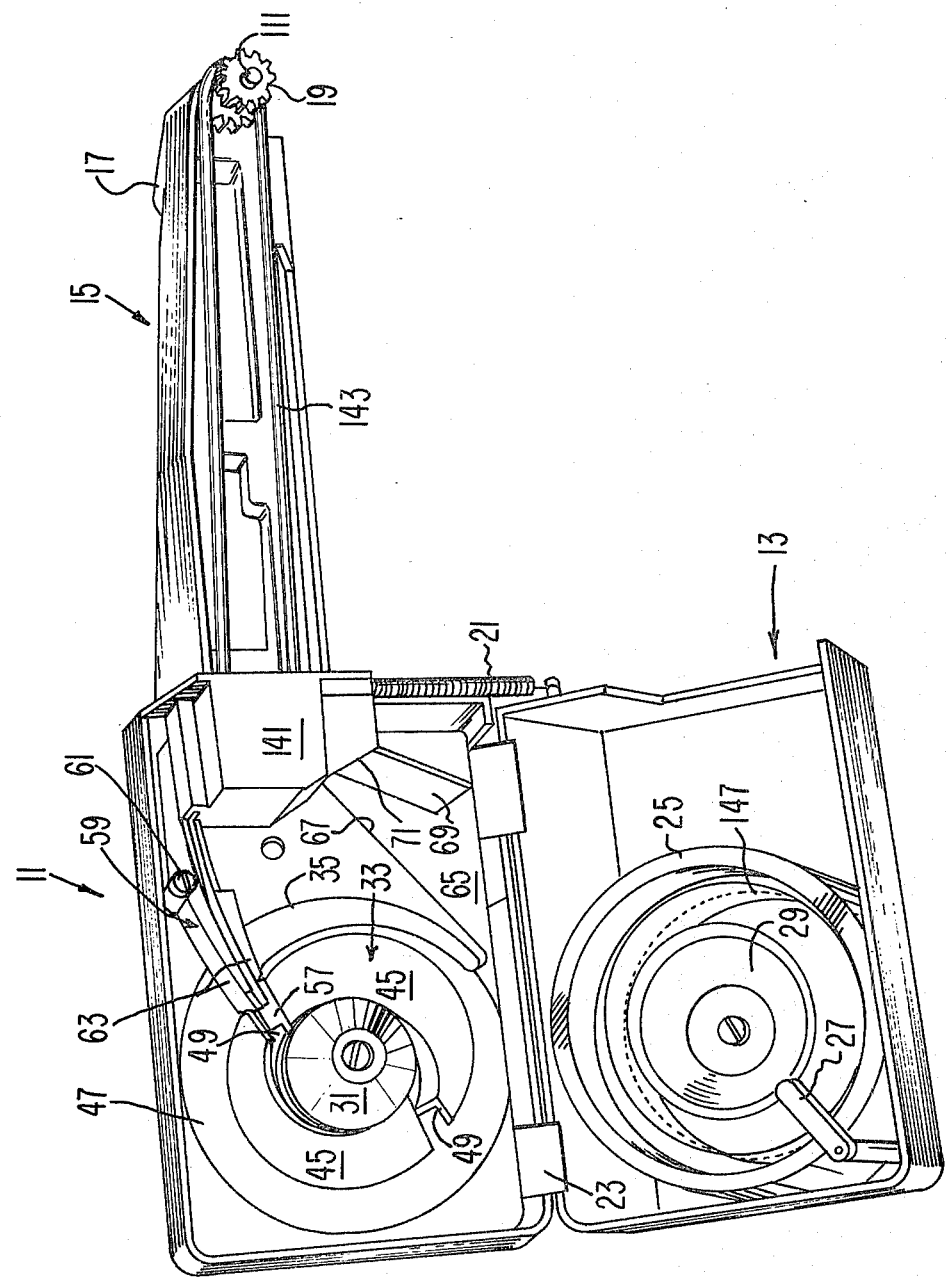
FIG. 1 is a view of the inventive unitary feed and rewind cartridge with the hinged lid section disposed in its open position to reveal the location of the tape container in the supply compartment, and various details of the rewind means disposed within the rewind compartment.
Figure 2:
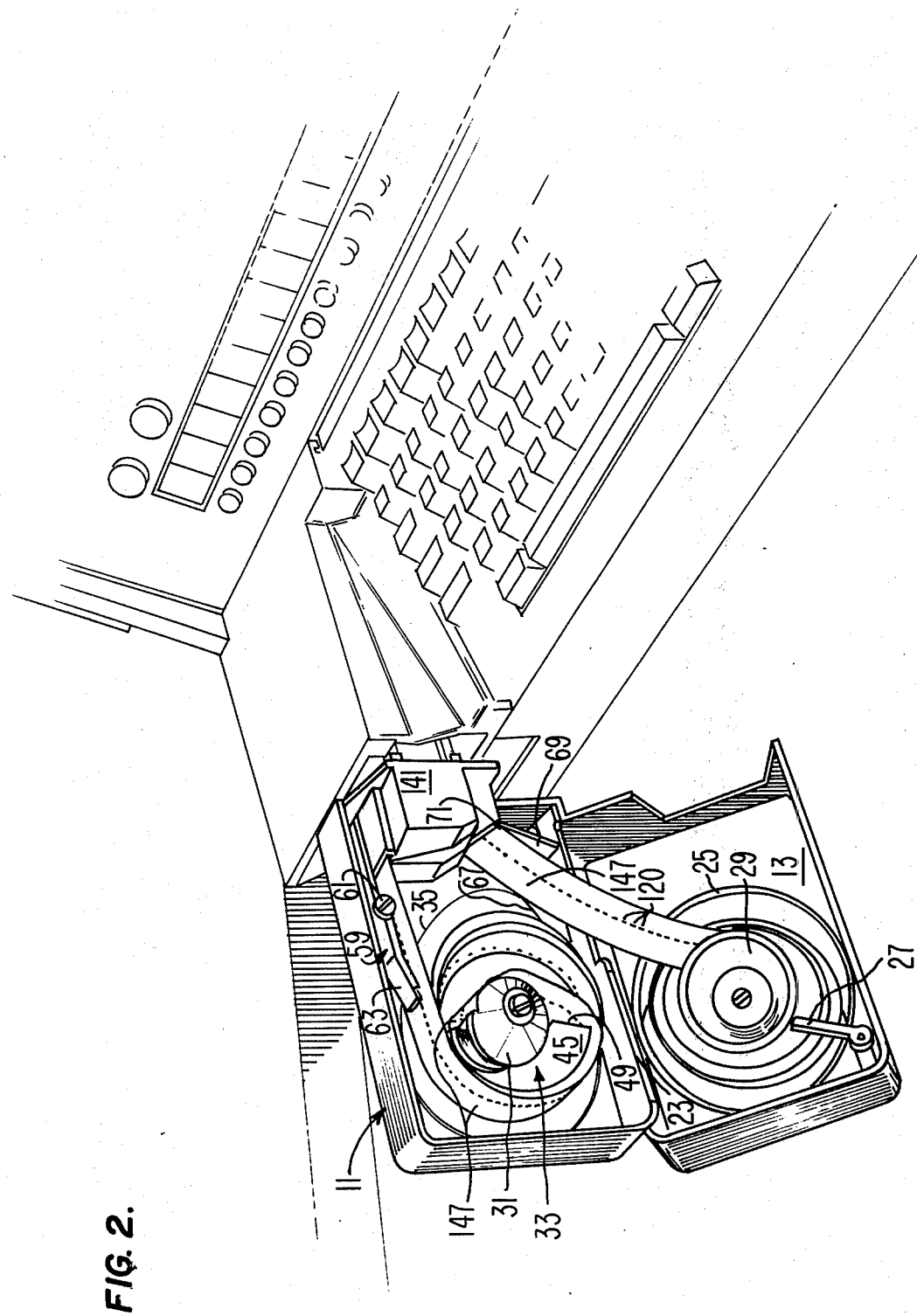
FIG. 2 is a perspective view of the inventive tape feed and rewind cartridge insertably positioned within the console of a computer and showing a double-ended information-bearing tape in the process of being feedably advanced into readable relationship with a tape reader disposed within the computer.
Figure 5:
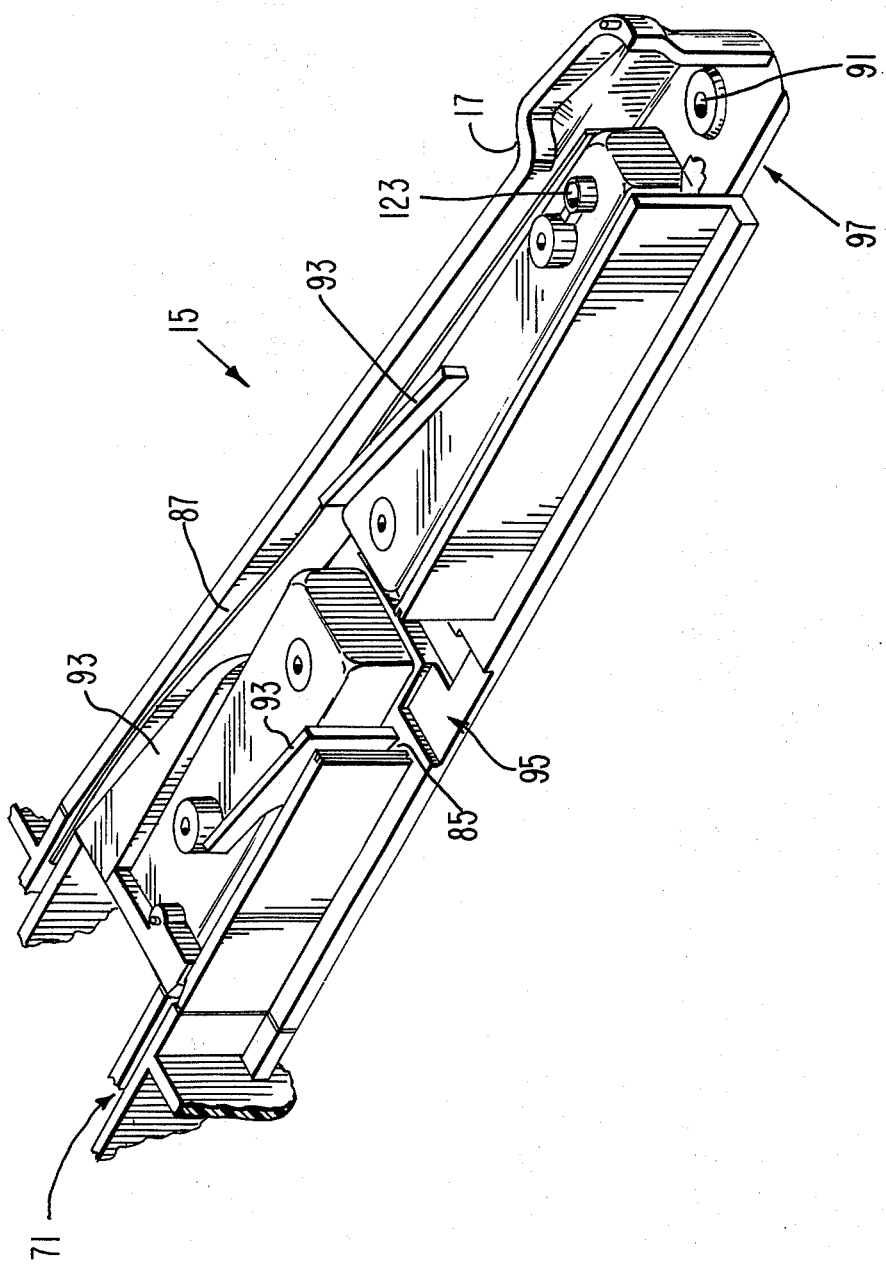
FIG. 5 is another perspective view of the elongated section showing various details of the transport guideways.

As suggested in the Summary of the Invention, supra, and with particular reference to FIGS. 1 and 2, the inventive tape feed and rewind cartridge is comprised of a main body section generally designated at 11 which serves as a rewind compartment, a hinged lid section generally designated at 13 which serves as a tape supply compartment, and an elongated section generally designated at 15 which serves to define a tape transport guideway along which a double-ended information-bearing tape may be feedably advanced by the drive means from the supply compartment to the rewind compartment. The elongated section 15, when inserted into the console of a computer (as illustrated in FIG. 2) is held in place within the computer by the blocking action of a resilient latch member of the computer (not shown) relative to an abutment surface 17 (FIG. 5) formed on the upper surface of the elongated section 15. Insertion of the elongated section 15 into the computer also serves to engage one of a pair of gears 19 forming a part of the previously referenced geared sprocket assembly with a corresponding gear associated with the memory loader of the computer, rotation of the gear 19 serving to feedably advance the tape along the transport guideway and to rewind the tape within the rewind compartment of the main body section 11. The lid section 13 may be hinged to the main body section 11 in any suitable manner, such that it may be disposed in the closed position shown in FIG. 8 when the cartridge is not in use, or disposed in the open position illustrated in FIGS. 1 and 2 when the cartridge is in an operating mode. An over-center spring 21 (FIG. 1) may be connected at one end to the body section 11 and at the other end to the lid section 13 to hold the lid section in both its closed and open positions.

It is to be noted from FIG. 2 that the hinged lid section 13, when in its open operating position, is blockably retained at a displacement angle of approximately 140°, in order that the information-bearing tape might be withdrawn from a tape of container positioned within the supply compartment and feedably advanced, without obstruction or undue twisting, into and along the transport guideway of the elongated section 15. This displacement angle of the lid section 13 relative to the main body section 11 may be provided for and defined by two or more coplanarly arranged foot embossments formed on the corresponding bottom surfaces of the main body section 11 and the lid section 13 in contiguous relationship to the edges thereof, such edges being identified by the hinges 23 in FIGS. 1 and 2. The lid section 13 may be provided with a rotatably mounted circular container 25 within which a helically coiled information-bearing tape may be inserted for readable processing by the cartridge, as by manually displacing a resilient retaining arm 27, or a storage container corresponding in configuration to the circular container 25 and housing a tape to be processed may be positioned in the lid section 13 to serve as a tape supply source. The circular container 25 or storage container used in place thereof should be provided with a flared central core member 29 to serve as a capstan around which the coils of the tape may be fed to the transport guideway of the elongated section 15.

The main body section 11 is provided with a rotatably mounted flywheel 31, and a take-up spool generally designated at 33 which is mounted for independent rotation relative to the flywheel 31, the flywheel 31 and take-up spool 33 being operably disposed within a well depression 35 formed in the main body section 11. The frontmost surface of the flywheel 31 (as viewed in FIG. 1) is preferably provided with a truncated conical configuration, as designated at 37 in FIG. 3, to provide clearance from the flared central core member 29 of the circular container 25 when the lid section 13 is disposed in its closed position. As also best illustrated in FIG. 3, the flywheel 31 is additionally provided with first and second annular recesses 39 and 41, respectively, the recess 39 providing predetermined clearance from a hereinafter described annular projection of the take-up spool 33, and the annular recess 41 positionably accommodating a resilient O-ring 43 the function of which is also hereinafter described.

The take-up spool 33 is comprised of a pair of arcuate segments 45 positionably connected to a disk-like flange 47, such segments being so dimensioned and positioned on the flange 47 as to provide a pair of oppositely disposed ingress channels 49 therebetween. The arcuate segments 45 are provided with concentric outer surfaces to accommodate the helical winding of the tape thereon, and may be provided with annular recesses such as are illustrated at 51 in FIG. 3 to facilitate the removal of the helically wound tape therefrom. The inner surface of each of the arcuate segments 45 is provided with an eccentric configuration relative to the flywheel 31, either by reason of the arc of a webbed wall 53 or the arc of the previously mentioned annular projection thereof, as designated at 55 in FIG. 3, the annular projections 55 of the segments 45 being coplanarly disposed relative to the first annular recess 39 of the flywheel 31. The function of the eccentric configuration of the inner surfaces of the arcuate segments 45, and of the annular projections 55, will be made apparent hereinafter in describing the operation of the tape feed and rewind cartridge. Each of the ingress channels 49 effectively separating the arcuate segments 45 of the take-up spool 33 is defined on one side thereof by a wall partition 57 best illustrated in FIG. 1, such wall partition substantially closing the annular recess 51 of its associated arcuate segment 45 at the end thereof having the greatest radial dimension.

Also provided within the main body section 11 is a resilient guide member 59 illustrated in FIGS. 1 and 2, such guide member being pivotally mounted by means of a screw or bolt 61 and comprised of a pair of integrally connected parallel deflection arms 63. This resilient guide member 59 is biased in a counterclockwise direction on the screw 61 by means of a spring (not shown), the free ends of the deflection arms 63 being thereby biased into engageable relationship relative to the annular recesses 51 formed in the concentric outer surfaces of the arcuate segments 45. It will be made apparent from a subsequent section devoted to the mounting of the flywheel 31 and the take-up spool 33, that a counterclockwise rotation of the flywheel 31 will cause the take-up spool 33 to be frictionally urged to rotate also in a counterclockwise direction. During such counterclockwise rotation of the take-up spool 33 and arcuate segments 45 thereof, one of the wall partitions 57 partly defining an ingress channel 49 will limit against the lowermost of the deflection arms 63 to thereby resiliently and detentably position the take-up spool 33. The main body section 11 also provides an entranceway to the tape transport guideway disposed within the elongated section 15, such entranceway, generally designated at 65 in FIG. 1, being defined by a web surface 67 and a deflection partition 69 which lead to a throat 71 forming the downstream entrance to the transport guideway.

Figure 3:
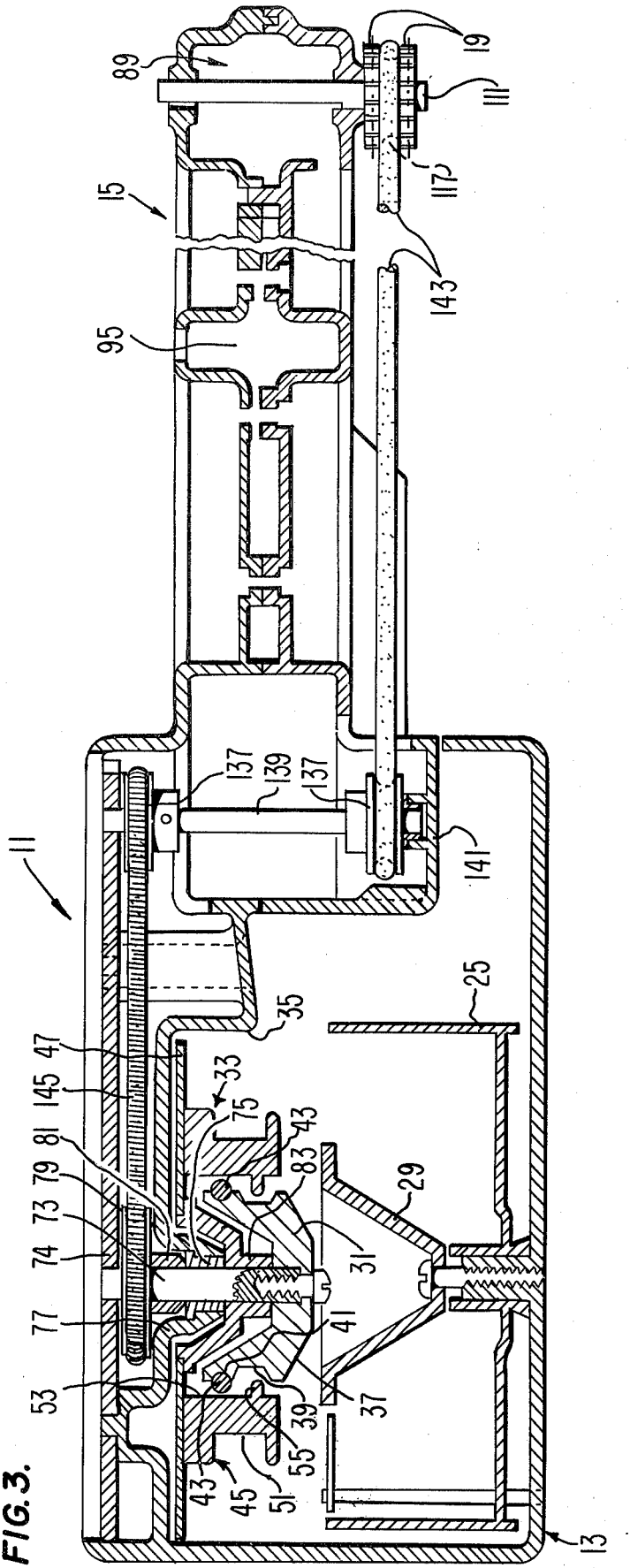
FIG. 3 is a plan view of the tape feed and rewind cartridge with the lid disposed in its closed position and showing various details of the flywheel and take-up spool of the rewind means disposed within the rewind compartment.
Figure 6:
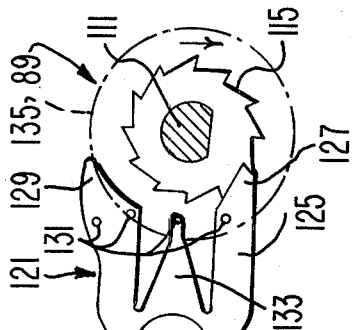
FIG. 6 is a fragmentary front view of the geared sprocket assembly disposed at the outermost extremity of the elongated section.
Figure 7A:
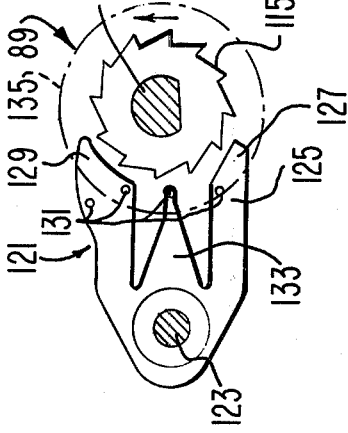
FIGS. 7A and 7B provide two different views of a three-arm pawl that is pivotally mounted in the transport guideway for preventing counter-rotation of the geared sprocket assembly.
Figure 7B:
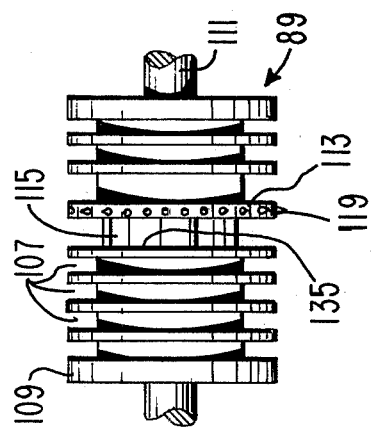
Figure 4:
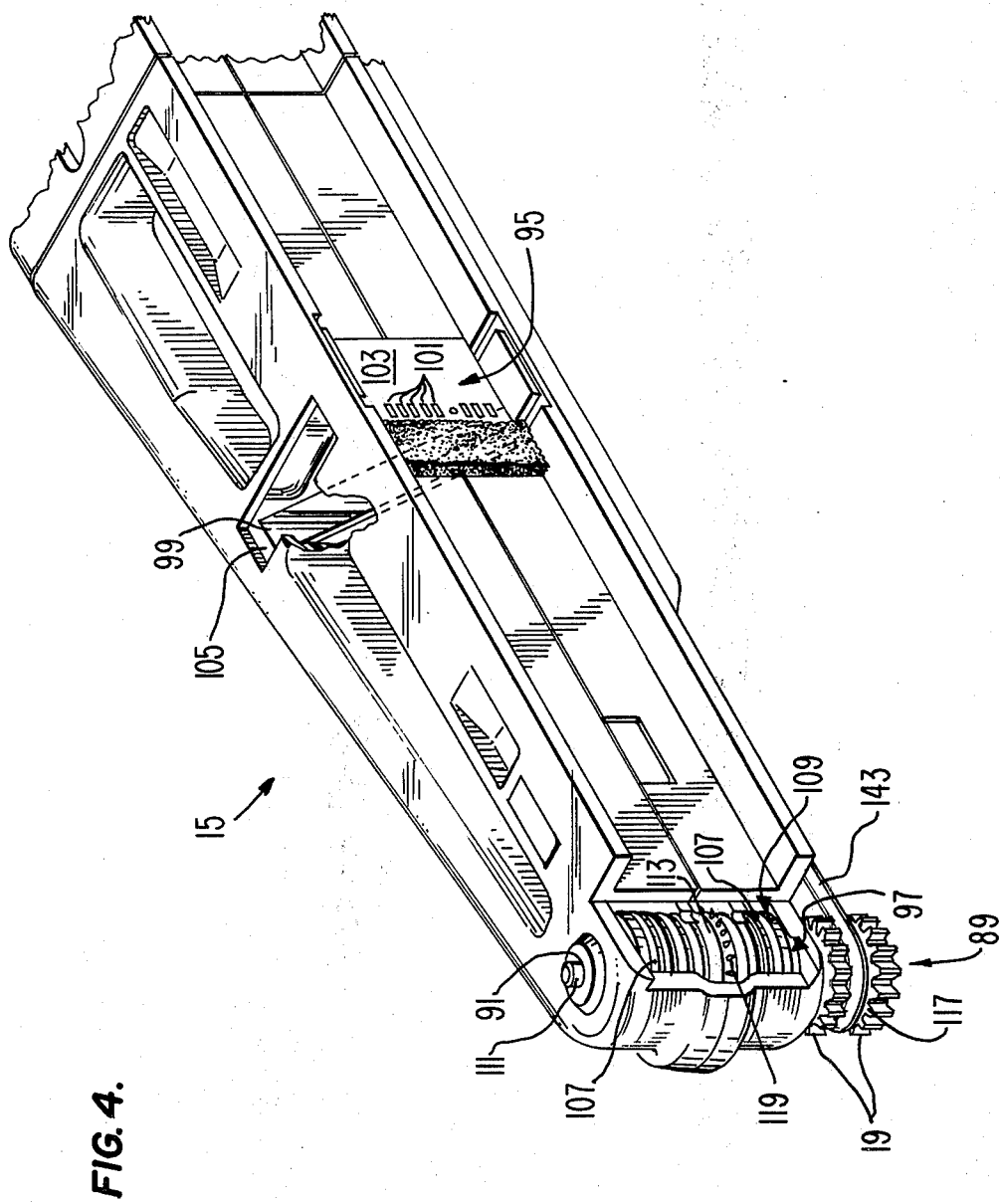
FIG. 4 is a perspective view of the elongated section of the cartridge showing the two separate read stations that are disposed along the transport guideway.

The main body section 11 also includes rotatable mounting for both the flywheel 31 and the take-up spool 33, as best illustrated in FIG. 3. Mounting of the flywheel 31 is accomplished by means of a driven shaft 73 journaled within a partition 74 and a bearing 75 securably positioned within an aperture formed in an adjoining partition 77, the flywheel 31 being securably connected to the inwardly directed extremity of the shaft 73 in any suitable fasion, e. g. as by means of a screw secured to internal threads formed in the shaft. Securably connected also to the driven shaft 73 is a drive pulley 79 having a hub portion 81 disposed in abutting relationship with the bearing 75, the function of the drive pulley 79 being defined in a later section devoted to the drive means of the cartridge. Mounting of the take-up spool 33, for independent rotation relative to the flywheel 31, is accomplished by means of a hub portion 83 forming a part of the previously referenced disk-like flange 47, the hub portion 83 being rotatably mounted on the driven shaft 73 intermediate the flywheel 31 and the bearing 75.

The elongated section 15 extending from the main body section 11 may best be described with reference to FIGS. 4 through 7B. It can be seen from FIG. 5 that the transport guideway housed within the elongated section 15 is comprised of an out-going pathway 85 and an in-going pathway 87, such pathways being directionally separated by a geared sprocket assembly generally designated at 89 in FIGS. 4 and 6. The geared sprocket assembly 89 is journaled within a pair of apertures 91 (FIGS. 4 and 5) formed at the outermost extremity of the elongated section 15. The pathways 85 and 87 include a plurality of integrally formed ramps and deflection members 93 (FIG. 5), and the out-going pathway 85 additionally includes a first read station 95 providing accommodation for a photo-electric memory loader, and a second read station 97 providing accommodation for a mechanically actuated memory loader of the type disclosed in the above referenced U.S. Pat. No. 3,562,493. The first read station 95 is defined by an angularly positioned mirror 99 (FIG. 4) and a plurality of sensing apertures 101 formed in a plate member 103. The function of the mirror 99 is to provide transmission of a beam of light received from a tape reader of a photo-electric memory loader, by way of an aperture 105 formed in the elongated section 15, through the codably configured apertures of the information-bearing tape and the apertures 101 of the plate member 103 to the photo-electric memory loader. The second read station 97 is defined by a plurality of parallel and circumferentially disposed grooves 107 formed in a drum 109 of the geared sprocket assembly 89, such grooves serving to accommodate the readable insertion of pins or interposers of a mechanically actuated memory loader when permitted entrance thereinto by the codably configured apertures formed in the information-bearing tape. It will be noted from FIGS. 4 and 6 that the geared sprocket assembly 89 is integrally formed with a shaft 111 which is journaled within the previously mentioned pair of apertures 91 formed in the elongated section, and that in addition to the circumferentially grooved drum 109 and the pair of gears 19, the geared sprocket assembly 89 also includes a tooth-bearing sprocket 113, a ratchet 115, and a pulley 117 formed intermediate the pair of gears 19. The tooth-bearing sprocket 113 is provided with a plurality of peripherally arranged feed teeth 119 that cooperate with corresponding feed apertures 120 (FIG. 2) formed in the information-bearing tape to thereby feedably advance the tape along the out-going and in-going pathways 85 and 87 during the counterclockwise rotation of the geared sprocket assembly 89.

A three-arm pawl 121 (FIGS. 7A and 7B) is pivotally mounted on a locating stud 123 (FIG. 5) to restrain the geared sprocket assembly 89 against counter-rotation. It can be seen from FIGS. 7A and 7B that the three-arm pawl 121 is comprised of a lower anti-backup arm 125 having a free-end extremity 127 that blockably cooperates with the ratchet 115 upon urging of the assembly in a clockwise direction, and that the free-end extremity of an upper arm 129 is so configured as to permit the counterclockwise rotation of the geared sprocket assembly 89. A plurality of projections 131 formed on the side surfaces of the upper and lower arms 129 and 125, respectively, and on the side surface of an intermediate arm 133, serve to apply a frictional force between the three-arm pawl 121 and the adjacent surface of an adjoining drum member 135, such frictional force serving to pivotally rotate the pawl 121 in a clockwise direction on the stud 123 when the geared sprocket assembly 89 is rotated in a counter-clockwise feed direction, to thereby dispose the free-end extremity 127 of the lower arm 125 clear of the teeth of the ratchet 115, and to rotate the pawl 121 and lower arm 125 into blockable relationship with the ratchet 115 when the geared sprocket assembly 89 is urged in a clockwise direction.

In addition to the main body section 11, the hinged lid section 13, and the elongated section 15, the inventive tape feed and rewind cartridge additionally comprises drive means of which the previously referenced drive pulley 79 and the pulley 117 form a part. With reference to FIG. 3, the drive means of the cartridge includes a pair of intermediate pulleys 137 housed within the rewind compartment and fixed in spaced-apart relationship to a shaft 139, the shaft 139 being journally mounted by means of the previously referenced partition 74 and an end wall 141 of a mounting compartment disposed within the main body section 11, a first of the intermediate pulleys 137 being belt-connected to the pulley 117 disposed intermediate the pair of gears 19, and a second of the intermediate pulleys 137 being belt-connected to the drive pulley 79 of the driven shaft 73. The belt connecting the pulley 117 and the first of the pulleys 137, illustrated at 143 in the drawing, may be composed of any suitable resilient solid material having a circular cross-section, and the belt connecting the drive pulley 79 to the second of the pulleys 137, illustrated at 145, may take the form of an endless spring.

OPERATION

Figure 8:
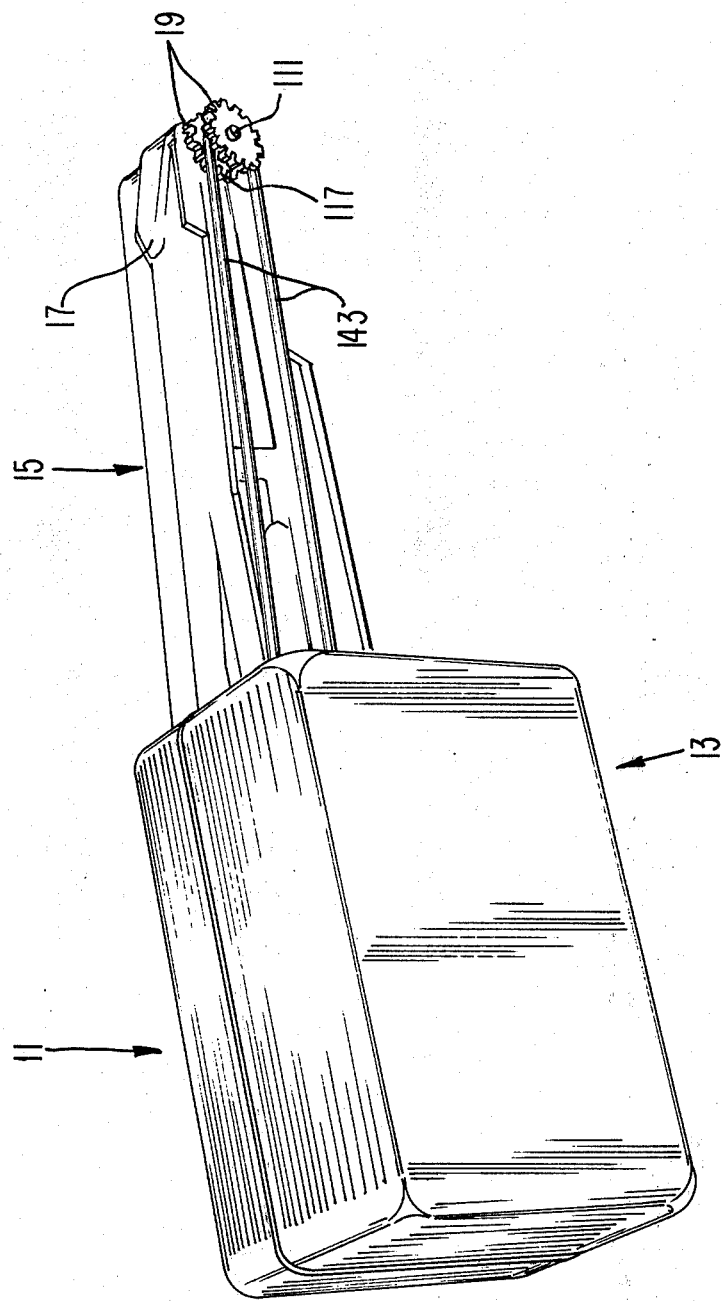
FIG. 8 is a perspective view of the tape feed and rewind cartridge with the lid section thereof disposed in its closed position.

With reference to FIGS. 1, 2 and 8, the inventive tape feed and rewind cartridge is utilizable by a computer operator for inputting information such as micro-instructions into the memory loader of the computer, such process involving the steps of: (1) inserting the elongated section 15 into the computer such that one of the pair of gears 19 is engaged with a power source of the memory loader; (2) displacing the hinged lid section 13 from the closed position illustrated in FIG. 8 to the open operable position illustrated in FIGS. 1 and 2; (3) installing a storage container with a helically coiled information-bearing tape 147 disposed therewithin, or inserting a helically coiled information-bearing tape 147 within the circular container 25 rotatably mounted in the lid section 13, either of such processes being facilitated by manually displacing the resilient retaining arm 27; (4) manually feeding the interior end of the helically coiled tape 147 between the deflection partition 69 and the web surface 67 into the throat 71 and along the out-going pathway 85 (FIG. 5) to the control of the tooth-bearing sprocket 113, the counterclockwise rotating geared sprocket assembly 89 thereafter feedably advancing the tape from the container in the lid section 13 to the control of the counterclockwise rotating flywheel 31. It is to be noted from the above description of the drive means of the tape feed and rewind cartridge that the counterclockwise rotation of the gear 19 and sprocket assembly 89 is accompanied by a corresponding counterclockwise rotation of the pair of intermediate pulleys 137 fixed to the shaft 139, and of the drive pulley 79, driven shaft 73 and flywheel 31. During the initial rotation of the driven shaft 73, the take-up spool 33 rotatably mounted thereon is frictionally rotated in a counterclockwise direction until limited by the detenting action of one of the wall partitions 57 coming to rest against the lowermost of the deflection arms 63 of the resilient guide member 59, the take-up spool 33 and arcuate segments 45 thereof remaining in such detented position until the leading end of the tape 147 is directed by the deflection arms 63 and the selected ingress channel 49 into impacting relationship between the resilient O-ring 43 of the flywheel and the webbed wall 53 and annular projection 55 of the receiving one of the arcuate segments 45, such impacting relationship of the leading end of the tape 147 serving to couple the take-up spool 33 to the counterclockwise rotating flywheel 31, and to thereafter helically wind the remainder of the tape onto the concentric outer periphery of the arcuate segments 45 as the resilient guide member 59 is held by the tape in its yieldably displaced position as illustrated in FIG. 2. Following the complete winding of the tape onto the concentric peripheral surfaces of the arcuate segments 45, the helically coiled tape is then manually removed from the take-up spool 33 and re-inserted into the circular container 25 for storage purposes, the tape being in a form suitable for re-entry into the cartridge and for re-reading by the memory loader without intervening rewinding.

Although a preferred embodiment of the inventive tape feed and rewind cartridge has been described in considerable detail, it will be appreciated that various changes and modifications therein may be made by those having ordinary skill in the art without departing from the true spirit and scope of the invention, it being intended that such spirit and scope be limited only by the appended claims.

What is claimed is:

1. A tape cartridge adapted for coupling with a tape reader and effective for feedably advancing and windably regathering double-ended information-bearing tapes of various lengths thereto and therefrom, said tape cartridge comprising:

a. an enclosed elongated tape transport guideway by means of which said cartridge is adapted for coupling with said tape reader, b. a rewind compartment integrally formed with said enclosed transport guideway and disposed in communicating relationship therewith, c. a supply compartment pivotally connected to said rewind compartment to form a closed and an angularly displaced open position relative thereto, said supply compartment when in its open position being effective for receiving a helically coiled double-ended tape and for disposing the innermost end thereof in communicable relationship with said tape transport guideway, d. one or more read stations disposed along said transport guideway by means of which the information recorded on said tape is rendered readable by said tape reader, said information recorded on said tape being codably represented by apertures formed therein, e. rewind apparatus disposed within said rewind compartment and effective for windably regathering a feedably advanced tape in reusable and re-feedable form, and f. drive means associated with said rewind apparatus and responsive to said tape reader to feedably advance a tape received within said supply compartment along said transport guideway and past said read station to the control of said rewind apparatus.

2. The tape cartridge defined in claim 1 wherein said rewind apparatus comprises:

a. a first rotatable member coupled to said drive means and mounted within said rewind compartment, said first rotatable member having a first and second annular recess, b. a second rotatable member mounted in encompassing and spaced-apart relationship with said first rotatable member, and for independent rotation relative to said first rotatable member and said drive means, and c. means responsive to the receipt of the leading end of an information-bearing tape feedably advanced along said transport guideway for coupling said second rotatable member with said first rotatable member such that the remainder of said tape is helically wound in reusable and re-feedable form around said second rotatable member.

3. The tape cartridge defined in claim 2 wherein the mounting of said first and second rotatable members is effectuated by means of a driven shaft forming part of said drive means and journaled within said rewind compartment, said first rotatable member being fixed to said driven shaft for unitary rotation therewith and said second rotatable member being mounted on said driven shaft for independent frictional rotation relative thereto.

4. The tape cartridge defined in claim 3 wherein said second rotatable member is a take-up spool comprising:

a. a hub portion rotatably mounted on said driven shaft, b. a disk-like flange fixed to one extremity of said hub portion, and c. a pair of spaced-apart arcuate segments fixed to said disk-like flange, each of said segments presenting a concentric outer arcuate surface and an eccentric inner arcuate surface relative to said first rotatable member, the spaced-apart distance between said pair of segments defining a pair of oppositely disposed ingress channels for receiving the leading end of an information-bearing tape and for admitting said leading end interiorly of said segments and into juxtaposed relationship relative to said first and said second rotatable members.

5. The tape cartridge defined in claim 4 wherein the concentric outer surface of each of said pair of spaced-apart segments is provided with an arcuate recess, and wherein each of said pair of oppositely disposed ingress channels is further defined by a wall partition effectively closing said arcuate recess of one of said segments at the extremity thereof opposite the extremity at which said segments inner surface bears the greatest eccentricity relative to said first rotatable member.

6. The tape cartridge defined in claim 5 wherein each of said spaced-apart segments of said second rotatable member is provided with an arcuately formed inwardly directed projection coplanarly disposed relative to the first annular recess of said first rotatable member, said projection contributing to the eccentric relationship of the segments inner surface relative to said first rotatable member and providing a minimal spaced-apart clearance therefrom at the point thereof contiguous to said wall partition effectively closing said arcuate recess formed in the segments concentric outer surface.

7. The tape cartridge defined in claim 5 wherein said means for coupling said second rotatable member with said first rotatable member comprises:

a. a resilient guide member pivotally connected at one end to said rewind compartment in communicating relationship with said tape transport guideway and cooperating at the other end thereof with said arcuate recesses and said wall partitions of said pair of arcuate segments, said guide member, during the unitary rotation of said driven shaft and said first rotatable member and the frictional rotation of said second rotatable member, cooperating detentably with the approaching one of said wall partitions to limitably position said second rotatable member such that the ingress channel detentably defined by said wall partition is disposed in communicating relationship with said guide member and said tape transport guideway, and b. a resilient O-ring disposed within said second annular recess formed in said first rotatable member, whereby upon the feedable advancement of an information-bearing tape by said drive means the leading end of said tape is deflected through said detentably defined ingress channel and into impacting relationship with said O-ring of said rotating first rotatable member and the eccentric inner surface of the downstream one of said arcuate segments at the point thereof having minimal clearance from said first rotatable member, said impacting relationship serving to couple said second rotatable member to said rotating first rotatable member and to thereafter windably regather said tape around the concentric outer surfaces of said pair of arcuate segments as said resilient guide member is deflected by said tape from its said communicating relationship with said arcuate recesses and said wall partitions of said arcuate segments.

8. The tape cartridge defined in claim 1 and additionally comprising a first and second read station disposed along said transport guideway, said first read station providing readable exposure of information-bearing tapes to a tape reader having light transmitting and sensing properties, and said second read station providing readable exposure of information-bearing tapes to a tape reader having mechanical setting and sensing properties, said first read station serving to reflect a beam of light transmitted by said tape reader through said codably represented apertures formed in said tape, and said second read station admitting sensing pins that are mechanically activated by said tape reader into cooperating relationship with said codably represented apertures.

9. The tape cartridge defined in claim 8 wherein said drive means includes a first gear operatively disposed at the extremity of said enclosed elongated tape transport guideway and contiguous to said second read station, said first gear being responsive to a tape reader having said light emitting and sensing properties, and a second gear adjacent said first gear and responsive to a tape reader having said mechanical setting and sensing properties.

10. A tape cartridge adapted for coupling with a memory loader of a computer and effective for selectively inputting data codably recorded on a plurality of double-ended tapes into the read-write memory of the computer, said cartridge comprising:
 a. means for receiving individual ones of said plurality of tapes in helically coiled configuration,
 b. means for transporting said individual tapes from said receiving means into readable relationship relative to said memory loader such that the data codably recorded thereon is inputted into said read-write memory,
 c. drive means responsive to said memory loader and effective for activating said transporting means, and
 d. means associated with said transporting means for windably regathering said individual tapes in helically coiled configuration such that said tapes in helically coiled configuration such that said tapes may be removed from said receiving means in a form that is suitable for subsequent selective inputting usage when activated by said drive means, said regathering means comprises:
  a first rotatably mounted member coupled to said drive means and provided with a first and second annular recess,
  a second rotatably mounted member disposed in encompassing and spaced-apart relationship with said first rotatably mounted member, said second member being mounted for independent rotation relative to said first rotatably mounted member and said drive means, and
  means responsive to the leading end of a double-ended tape received within said receiving means and transported by said transporting means for coupling said second rotatably mounted member with said first rotatably mounted member such that the remainder of said tape is helically wound in reusable form around said second rotatably mounted member.

11. The tape cartridge defined in claim 10 wherein the mounting of said first and second rotatably mounted members is effectuated by means of a driven shaft forming part of said drive means, said first rotatably mounted member being fixed to said driven shaft for unitary rotation therewith and said second rotatably mounted member being mounted on said driven shaft for independent frictional rotation relative thereto.

12. The tape cartridge defined in claim 11 wherein said second rotatably mounted member is a take-up spool comprising:
 a. a hub portion rotatably mounted on said driven shaft,
 b. a disk-like flange fixed to one extremity of said hub portion, and
 c. a pair of spaced-apart arcuate segments fixed to said disk-like flange, each of said segments presenting a concentric outer arcuate surface and an eccentric inner arcuate surface relative to said first rotatably mounted member, the spaced-apart distance between said pair of segments defining a pair of oppositely disposed ingress channels for receiving the leading end of an information-bearing tape and for admitting said leading end interiorly of said segments and into juxtaposed relationship relative to said first and said second rotatably mounted members.

13. The tape cartridge defined in claim 12 wherein the concentric outer surface of each of said pair of spaced-apart segments is provided with an arcuate recess, and wherein each of said pair of oppositely disposed ingress channels is further defined by a wall partition effectively closing said arcuate recess of one of said segments at the extremity thereof opposite the extremity at which said segments inner surface bears the greatest eccentricity relative to said first rotatably mounted member.

14. The tape cartridge defined in claim 13 wherein each of said spaced-apart segments of said second rotatably mounted member is provided with an arcuately formed inwardly directed projection coplanarly disposed relative to the first annular recess of said first rotatably mounted member, said projection contributing to the eccentric relationship of the segments inner surface relative to said first rotatably mounted member and providing a minimal spaced-apart clearance therefrom at the point thereof contiguous to said wall partition effectively closing said arcuate recess formed in the segments concentric outer surface.

15. The tape cartridge defined in claim 13 wherein said means for coupling said second rotatably mounted member with said first rotatably mounted member comprises:
 a. a pivotally and resiliently mounted guide member disposed in cooperating relationship with said arcuate recesses and said wall partitions of said pair of arcuate segments, said guide member, during the unitary rotation of said driven shaft and said first rotatably mounted member and the frictional rotation of said second rotatably mounted member, cooperating detentably with the approaching one of said wall partitions to limitably position said second rotatably mounted member such that the ingress channel detentably defined by said wall partition is disposed in communicating relationship with said guide member, and
 b. a resilient O-ring disposed within said second annular recess formed in said first rotatably mounted member, whereby upon the feedable advancement of an information-bearing tape by said drive means the leading end of said tape is deflected through said detentably defined ingress channel, and into impacting relationship with said O-ring of said rotating first rotatably mounted member and the eccentric inner surface of the downstream one of said arcuate segments at the point thereof having minimal clearance from said first rotatably mounted member, said impacting relationship serving to couple said second rotatably mounted member to said rotating first rotatably mounted member and to thereafter windably regather said tape on the concentric outer surfaces of said pair of arcuate segments as said guide member is deflected by said tape from its said communicating relationship with said arcuate recesses and said wall partitions of said arcuate segments.

16. In a tape handler having drive means for transporting individually inserted helically coiled double-ended information-bearing tapes into exposed readable relationship with a tape reader and then to a rewind compartment of the handler, improved tape rewinding apparatus comprising:
   a. a first rotatable member coupled to said drive means and mounted within said rewind compartment, said first rotatable member having a first and second annular recess,
   b. a second rotatable member mounted in encompassing and spaced-apart relationship with said first rotatable member, and for independent rotation relative to said first rotatable member and said drive means, and
   c. means responsive to the receipt of the leading end of an information-bearing tape transported from said exposed relationship with a said tape reader, for coupling said second rotatable member with said first rotatable member such that the remainder of said tape is helically wound in reusable and re-readable form around said second rotatable member.

17. The tape rewinding apparatus defined in claim 16 wherein the mounting of said first and second rotatable members is effectuated by means of a driven shaft forming part of said drive means and journaled within said rewind compartment, said first rotatable member being fixed to said driven shaft for unitary rotation therewith and said second rotatable member being mounted on said driven shaft for independent frictional rotation relative thereto.

18. The tape rewinding apparatus defined in claim 17 wherein said second rotatable member is a take-up spool comprising:
   a. a hub portion rotatably mounted on said driven shaft,
   b. a disk-like flange fixed to one extremity of said hub portion, and
   c. a pair of spaced-apart arcuate segments fixed to said disk-like flange, each of said segments presenting a concentric outer arcuate surface and an eccentric inner arcuate surface relative to said first rotatable member, the spaced-apart distance between said pair of segments defining a pair of oppositely disposed ingress channels for receiving the leading end of an informaton-bearing tape and for admitting said leading end interiorly of said segments and into juxtaposed relationship relative to said first and said second rotatable members.

19. The tape rewinding apparatus defined in claim 18 wherein the concentric outer surface of each of said pair of spaced-apart segments is provided with an arcuate recess, and wherein each of said pair of oppositely disposed ingress channels is further defined by a wall partition effectively closing said arcuate recess of one of said segments at the extremity thereof opposite the extremity at which said segments inner surface bears the greatest eccentricity relative to said first rotatable member.

20. The tape rewinding apparatus defined in claim 19 wherein each of said spaced-apart segments of said second rotatable member is provided with an arcuately formed inwardly directed projection coplanarly disposed relative to the first annular recess of said first rotatable member, said projection contributing to the eccentric relationship of the segments inner surface relative to said first rotatable member and providing a minimal spaced-apart clearance therefrom at the point thereof contiguous to said wall partition effectively closing said arcuate recess formed in the segments concentric outer surface.

21. The tape rewinding apparatus defined in claim 19 wherein said means for coupling said second rotatable member with said first rotatable member comprises:
   a. a resilient guide member pivotally connected at one end to said rewind compartment in the pathway leading from said exposed relationship of the tape with said tape reader, and cooperating at the other end thereof with said arcuate recesses and said wall partitions of said pair of arcuate segments, said guide member, during the unitary rotation of said driven shaft and said first rotatable member and the frictional rotation of said second rotatable member, cooperating detentably with the approaching one of said wall partitions to limitably position said second rotatable member such that the ingress channel detentably defined by said wall partition lies within said pathway leading from said exposed relationship with said tape reader, and
   b. a resilient O-ring disposed within said second annular recess formed in said first rotatable member, whereby upon the transporting of an information-bearing tape by said drive means the leading end of said tape is deflected through said detentably defined ingress channel and into impacting relationship with said O-ring of said rotating first rotatable member and the eccentric inner surface of the downstream one of said arcuate segments at the point thereof having minimal clearance from said first rotatable member, said impacting relationship serving to couple said second rotatable member to said first rotatable member and to thereafter windably regather said tape around the concentric outer surfaces of said pair of arcuate segments as said resilient guide member is deflected by said tape from its communicating relationship with said arcuate recesses and said wall partitions of said arcuate segments.

22. In a tape handler having drive means for transporting individually inserted helically coiled double-ended information-bearing tapes into exposed readable relationship with a tape reader and then to a rewind compartment of the handler, improved tape rewinding apparatus comprising:
   a. a flywheel rotatably mounted within said rewind compartment and coupled to said drive means, said flywheel having a first and second annular recess,
   b. a take-up spool rotatably mounted in encompassing and spaced-apart relationship with said flywheel, and for independent rotation relative to said flywheel and said drive means, and
   c. means responsive to the receipt of the leading end of an information-bearing tape for coupling said take-up spool with said flywheel such that the remainder of said tape is helically wound in reusable and re-feedable form around the outer periphery of said take-up spool.

23. The tape rewinding apparatus defined in claim 22 wherein the mounting of said flywheel and said take-up spool is effectuated by means of a driven shaft forming part of said drive means and journaled within said rewind compartment, said flywheel being fixed to said driven shaft for unitary rotation therewith and said take-up spool being mounted on said driven shaft for independent frictional rotation relative thereto.

24. The tape rewinding apparatus defined in claim 23 wherein said take-up spool comprises:
   a. a hub portion rotatably mounted on said driven shaft,
   b. a disk-like flange fixed to one extremity of said hub portion, and
   c. a pair of spaced-apart arcuate segments fixed to said disk-like flange, each of said segments presenting a concentric outer arcuate surface and an eccentric inner arcuate surface relative to said flywheel, the spaced-apart distance between said pair of segments defining a pair of oppositely disposed ingress channels for receiving the leading end of an information-bearing tape and for admitting said leading end interiorly of said segments and into juxtaposed relationship relative to said flywheel and said take-up spool.

25. The tape rewinding apparatus defined in claim 24 wherein the concentric outer surface of each of said pair of spaced-apart segments is provided with an arcuate recess, and wherein each of said pair of oppositely disposed ingress channels is further defined by a wall partition effectively closing said arcuate recess of one of said segments at the extremity thereof opposite the extremity at which said segments inner surface bears the greatest eccentricity relative to said flywheel.

26. The tape rewinding apparatus defined in claim 25 wherein each of said spaced-apart segments of said take-up spool is provided with an arcuately formed inwardly directed projection coplanarly disposed relative to the first annular recess of said flywheel, said projection contributing to the eccentric relationship of the segments inner surface relative to said flywheel and providing a minimal spaced-apart clearance therefrom at the point thereof contiguous to said wall partition effectively closing said arcuate recess formed in the segments concentric outer surface.

27. The tape rewinding apparatus defined in claim 25 wherein said means for coupling said take-up spool with said flywheel comprises:
   a. a resilient guide member pivotally connected at one end to said rewind compartment in the pathway leading from said exposed relationship of the tape with said tape reader, and cooperating at the other end thereof with said arcuate recesses and said wall partitions of said pair of arcuate segments, said guide member, during the unitary rotation of said driven shaft and said flywheel and the frictional rotation of said take-up spool, cooperating detentably with the approaching one of said wall partitions to limitably position said take-up spool such that the ingress channel detentably defined by said wall partition is disposed in communicating relationship with said guide member, and
   b. a resilient O-ring disposed within said second annular recess formed in said flywheel, whereby upon the transporting of an information-bearing tape by said drive means the leading end of said tape is deflected through said detentably defined ingress channel, and into impacting relationship with said O-ring of said rotating flywheel and the eccentric inner surface of the downstream one of said arcuate segments of said take-up spool at the point thereof having minimal clearance from said flywheel, said impacting relationship serving to couple said take-up spool to said flywheel and to thereafter windably regather said tape on the concentric outer surfaces of said pair of arcuate segments as said guide member is deflected by said tape from its communicating relationship with said arcuate recesses and said wall partitions of said arcuate segments.

28. A cartridge for processing helically coiled double-ended information-bearing tapes and for transportably exposing individual ones of said tapes to a tape reader such that the information recorded thereon may be read by said tape reader, said cartridge comprising:
   a. means for coupling said cartridge to said tape reader,
   b. means for receiving individual ones of said helically coiled tapes,
   c. means responsive to said tape reader for transporting a tape received within said receiving means into exposed readable relationship with said tape reader, and
   d. means responsive to said transporting means for accepting a tape exposably read by said tape reader and for windably regathering said read tape in helically coiled configuration suitable for subsequent re-reading by said tape reader, said accepting and regathering means comprises:
      a first rotatably mounted member coupled to said transporting means and provided with a first and second annular recess,
      a second rotatably mounted member disposed in encompassing and spaced-apart relationship with said first rotatably mounted member, said second member being mounted for independent rotation relative to said first rotatably mounted member and said transporting means, and
      means responsive to the leading end of a double-ended tape received within said receiving means and transported by said transporting means for coupling said second rotatably mounted member with said first rotatably mounted member such that the remainder of said tape is helically wound in re-readable form around said second rotatably mounted member.

29. The cartridge defined in claim 28 wherein the mounting of said first and second rotatably mounted members is effectuated by means of a driven shaft forming part of said transporting means, said first rotatably mounted member being fixed to said driven shaft for unitary rotation therewith and said second rotatably mounted member being mounted on said driven shaft for independent frictional rotation relative thereto.

30. The cartridge defined in claim 29 wherein said second rotatably mounted member is a take-up spool comprising:
   a. a hub portion rotatably mounted on said driven shaft,
   b. a disk-like flange fixed to one extremity of said hub portion, and
   c. a pair of spaced-apart arcuate segments fixed to said disk-like flange, each of said segments presenting a concentric outer arcuate surface and an eccentric inner arcuate surface relative to said first rotatably mounted member, the spaced-apart distance between said pair of segments defining a pair of oppositely disposed ingress channels for receiving the leading end of an information-bearing tape and for admitting said leading end interiorly of said segments and into juxtaposed relationship relative to said first and said second rotatably mounted members.

31. The cartridge defined in claim 30 wherein the concentric outer surface of each of said pair of spaced-apart segments is provided with an arcuate recess, and wherein each of said pair of oppositely disposed ingress channels is further defined by a wall partition effectively closing said arcuate recess of one of said segments at the extremity thereof opposite the extremity at which said segments inner surface bears the greatest eccentricity relative to said first rotatably mounted member.

32. The cartridge defined in claim 31 wherein each of said spaced-apart segments of said second rotatably mounted member is provided with an arcuately formed inwardly directed projection coplanarly disposed relative to the first annular recess of said first rotatably mounted member, said projection contributing to the eccentric relationship of the segments inner surface relative to said first rotatably mounted member and providing a minimal spaced-apart clearance therefrom at the point thereof contiguous to said wall partition effectively closing said arcuate recess formed in the segments concentric outer surface.

33. The cartridge defined in claim 31 wherein said means for coupling said second rotatably mounted member with said first rotatably mounted member comprises:

a. a pivotally and resiliently mounted guide member disposed in cooperating relationship with said arcuate recesses and said wall partitions of said pair of arcuate segments, said guide member, during the unitary rotation of said driven shaft and said first rotatably mounted member and the frictional rotation of said second rotatably mounted member, cooperating detentably with the approaching one of said wall partitions to limitably position said second rotatably mounted member such that the ingress channel detentably defined by said wall partition is disposed in communicating relationship with said guide member, and b. a resilient O-ring disposed within said second annular recess formed in said first rotatably mounted member, whereby upon the feedable advancement of an information-bearing tape by said transporting means the leading end of said tape is deflected through said detentably defined ingress channel, and into impacting relationship with said O-ring of said rotating first rotatably mounted member and the eccentric inner surface of the downstream one of said arcuate segments at the point thereof having minimal clearance from said first rotatably mounted member, said impacting relationship serving to couple said second rotatably mounted member to said rotating first rotatably mounted member and to thereafter windably regather said tape on the concentric outer surfaces of said pair of arcuate segments as said guide member is deflected by said tape from its said communicating relationship with said arcuate recesses and said wall partitions of said arcuate segments.

* * * * *